United States Patent
Dachman-Soled et al.

(10) Patent No.: US 12,244,687 B2
(45) Date of Patent: Mar. 4, 2025

(54) TAMPER-RESISTANT DATA ENCODING SECURE AGAINST UNBOUNDED POLYNOMIAL SIZE ATTACK COMPLEXITY

(71) Applicant: NTT RESEARCH INC., Sunnyvale, CA (US)

(72) Inventors: Dana Dachman-Soled, College Park, MD (US); Ilan Komargodski, Tel Aviv (IL); Rafael N Pass, New York, NY (US)

(73) Assignees: NTT Research Inc., Sunnyvale, CA (US); University of Maryland, College Park, College Park, MD (US); Cornell University, Ithaca, NY (US)

( * ) Notice: Subject to any disclaimer, the term of this patent is extended or adjusted under 35 U.S.C. 154(b) by 330 days.

(21) Appl. No.: 18/012,226

(22) PCT Filed: Jun. 22, 2021

(86) PCT No.: PCT/US2021/038479
§ 371 (c)(1),
(2) Date: Dec. 21, 2022

(87) PCT Pub. No.: WO2021/262716
PCT Pub. Date: Dec. 30, 2021

(65) Prior Publication Data
US 2023/0275741 A1  Aug. 31, 2023

Related U.S. Application Data

(60) Provisional application No. 62/705,363, filed on Jun. 23, 2020.

(51) Int. Cl.
*H04L 9/32* (2006.01)
*H04L 9/00* (2022.01)

(52) U.S. Cl.
CPC ............ *H04L 9/005* (2013.01); *H04L 9/3218* (2013.01)

(58) Field of Classification Search
CPC ..... H04L 9/005; H04L 9/3218; H04L 9/0838; H04L 9/083; H04L 9/14; H04L 9/3093;
(Continued)

(56) References Cited

U.S. PATENT DOCUMENTS

| | | | |
|---|---|---|---|
| 2005/0050364 A1* | 3/2005 | Feng ................... | H04L 63/1458 726/4 |
| 2010/0031315 A1* | 2/2010 | Feng ................... | H04L 63/1458 709/229 |

(Continued)

OTHER PUBLICATIONS

International Search Report, International Preliminary Report on Patentability, and Written Opinion in PCT/US2021/038479, 21 pgs.

*Primary Examiner* — Le H Luu
(74) *Attorney, Agent, or Firm* — Cipher Law

(57) ABSTRACT

Systems, methods, network devices, and machine-readable media disclosed herein include encoding data for storage or transmission by encoding the data according to a tamper-resistant data encoding scheme that renders the data secure against unbounded polynomial size attacks. The present disclosure further includes subsequently determining whether the data has been tampered with, and notifying a processor when the data has been modified or compromised.

16 Claims, 6 Drawing Sheets

(58) Field of Classification Search
CPC ............... H04L 9/3221; H04L 63/0421; H04L 63/1458; G06F 21/64
See application file for complete search history.

(56) References Cited

U.S. PATENT DOCUMENTS

| | | |
|---|---|---|
| 2010/0185863 A1 | 7/2010 | Rabin et al. |
| 2011/0087885 A1 | 4/2011 | Lerner |
| 2011/0317838 A1* | 12/2011 | Garcia Morchon .... H04L 9/083 380/259 |
| 2013/0114810 A1* | 5/2013 | Kobayashi ................ H04L 9/14 380/47 |
| 2013/0297930 A1* | 11/2013 | Sakumoto ............. H04L 9/3221 713/155 |
| 2017/0250796 A1* | 8/2017 | Samid ................... H04L 9/0838 |
| 2018/0309574 A1* | 10/2018 | Lyubashevsky ...... H04L 9/3093 |
| 2020/0097648 A1* | 3/2020 | Soriente ............. H04L 63/0421 |
| 2022/0224534 A1* | 7/2022 | Wright .................... G06F 21/64 |

\* cited by examiner

Algorithm NMCode.E($1^\lambda$, m) for m ∈ $\{0,1\}^\lambda$:

1. (vk, sk) ← Sig.G($1^\lambda$).

2. Z ← TL.Gen($1^\lambda$, $\overline{T}^{2/\epsilon}$, m; $r_{TL}$) with uniformly random $r_{TL}$.

3. (c, $r_{NMCom}$) ← NMCom.C($1^\lambda$, m, tag = vk).

4. Compute a ZK proof $\pi$ ← ZK.P(.,., $1^\lambda$) for the relation $R_u$ from Figure 4 using (vk, Z, c) as the instance and ($r_{TL}$, m, $r_{NMCom}$) as the witness.

5. $\sigma$ ← Sig.s(sk, (Z, c, $\pi$)).

6. Output $\hat{Z}$ = (vk, Z, c, $\pi$, $\sigma$).

FIG. 3

Algorithm NMCode.D(vk, Z, c, $\pi$, $\sigma$):

1. Verify the signature $\sigma$:

$$\text{Sig.V}(vk, (Z, c, \pi), \sigma) \stackrel{?}{=} 1.$$

2. Verify the proof $\pi$:

$$\text{ZK.V}((vk, Z, c), \pi) \stackrel{?}{=} 1.$$

3. If both accept, output TL.Sol(Z). Otherwise, output $0^\lambda$.

FIG. 4

Relation $R_u$ (((vk, Z, c), ($r_{TL}$, m, $r_{NMCom}$))):

- Instance: a verification key vk, a Puzzle generated by TL.Gen($1^\lambda$, $\bar{T}^{2/\epsilon}$, m), and a commitment c.
- Witness: a string $t_{TL} \in \{0, 1\}^*$, a string $m \in \{0, 1\}^\lambda$, and a string $r_{NMCom} \in \{0, 1\}^*$.
- Statement: TL.Gen($1^\lambda$, $\bar{T}^{2/\epsilon}$, m; $r_{TL}$) = Z and NMCom.O(c, m, $r_{NMCom}$, tag = vk) = 1.

FIG. 5

TAMPER-RESISTANT DATA ENCODING SECURE AGAINST UNBOUNDED POLYNOMIAL SIZE ATTACK COMPLEXITY

CROSS-REFERENCE TO RELATED APPLICATIONS

This application is a national stage application, filed under 35 U.S.C. § 371, of International Patent Application No. PCT/US2021/038479, filed Jun. 22, 2021, which claims the benefit of U.S. Provisional Application No. 62/705,363 filed Jun. 23, 2020, the contents of both of which are hereby incorporated in their entireties.

GOVERNMENT LICENSE RIGHTS

This invention was made with government support under NSF grants nos. CNS-1933033, and CNS-1453045 (CAREER), and by financial assistance award 70NANB15H328 from the U.S. Department of Commerce, National Institute of Standards and Technology, and is further supported in part by NSF Award SATC-1704788, NSF Award RI-1703846, AFOSR Award FA9550-18-1-0267, and by NSF Award DGE-1650441. This research is based upon work supported in part by the Office of the Director of National Intelligence (ODNI), Intelligence Advanced Research Projects Activity (IARPA), via 2019-19-020700006. The U.S. government has certain rights in the invention.

FIELD OF THE INVENTION

The present disclosure relates to systems, methods, network devices, and machine-readable media for a tamper-resistant encoding for providing data that is secure against tampering functions having unlimited polynomial size.

BACKGROUND OF THE INVENTION

A non-malleable or tamper-resistant code is a concept that allows one to encode messages such that it is impossible to modify the underlying message of a given codeword without decoding it first. More precisely, the operation applied to the codeword is called the tampering function, and the guarantee is that, with high probability, decoding a tampered codeword results in either the original message or an unrelated one. We refer to the probability that the attacker succeeds in coming up with a tampered codeword of a related message as its distinguishing advantage, and we typically require this advantage to be negligible (i.e., smaller than the inverse of any polynomial). Note that in contrast to standard error-correcting (or detecting) codes, non-malleable codes can achieve security against tampering functions that modify every part of a codeword.

Since the introduction of the notion of non-malleable codes, a large body of work has focused on realizing coding schemes that are secure against various classes of tampering functions. However, non-malleable codes in the plain model (i.e., without trusted setup) that are secure against bounded polynomial-size tampering are not known, and obtaining such non-malleable codes has been a major, unresolved problem. For example, partial solutions either require an untamperable common reference string or strong and non-standard cryptographic assumptions that are only known to be instantiated in the Random Oracle model, and even then only achieve a weak form of non-malleability.

As such, a need exists for an explicit non-malleable code that is secure against all tampering functions and that can be computed by arbitrary (e.g., unbounded) polynomial-size circuits of bounded polynomial depth.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings:

FIG. 3 illustrates an example method for encoding data for tamper-resistance.

FIG. 4 illustrates an example method for decoding data that has been encoded for tamper-resistance.

FIG. 5 illustrates an example method for decoding data that had been encoded for tamper-resistance.

DETAILED DESCRIPTION

Examples of construction of a non-malleable code that secures against all polynomial-size tampering functions that have bounded polynomial-depth are described herein. This is an even larger class than all bounded polynomial-size functions and, in particular, captures all functions in non-uniform NC (while previously there was no construction for NC). The construction is in the plain model (i.e., no trusted setup) and relies on several cryptographic assumptions such as keyless hash functions, time-lock puzzles, as well as other standard assumptions. Additionally, such construction has several appealing properties: the complexity of encoding is independent of the class of tampering functions and we obtain a sub-exponentially small error.

In examples of the present disclosure, we construct an efficient non-malleable code that is computationally secure against tampering functions computable by any bounded polynomial-size circuit. Such construction is in the plain model and relies on several generic and well-studied cryptographic building blocks: a time-lock puzzle, a non-interactive non-malleable commitment, and a non-interactive SPS (super-polynomial-time simulatable) zero-knowledge protocol (all in the plain model).

Such construction captures an even larger class of tampering functions. Specifically, we provide a non-malleable code secure against all tampering functions that can be computed by an arbitrary (unbounded) polynomial-size circuit of bounded polynomial-depth. We emphasize that while the circuit depth of the tampering function is bounded a priori by some fixed polynomial in the security parameter, the size of the circuit is unbounded and can be any polynomial in the security parameter.

Several non-limiting examples of applications and implementations of the inventive security feature are described below.

Figure 1:
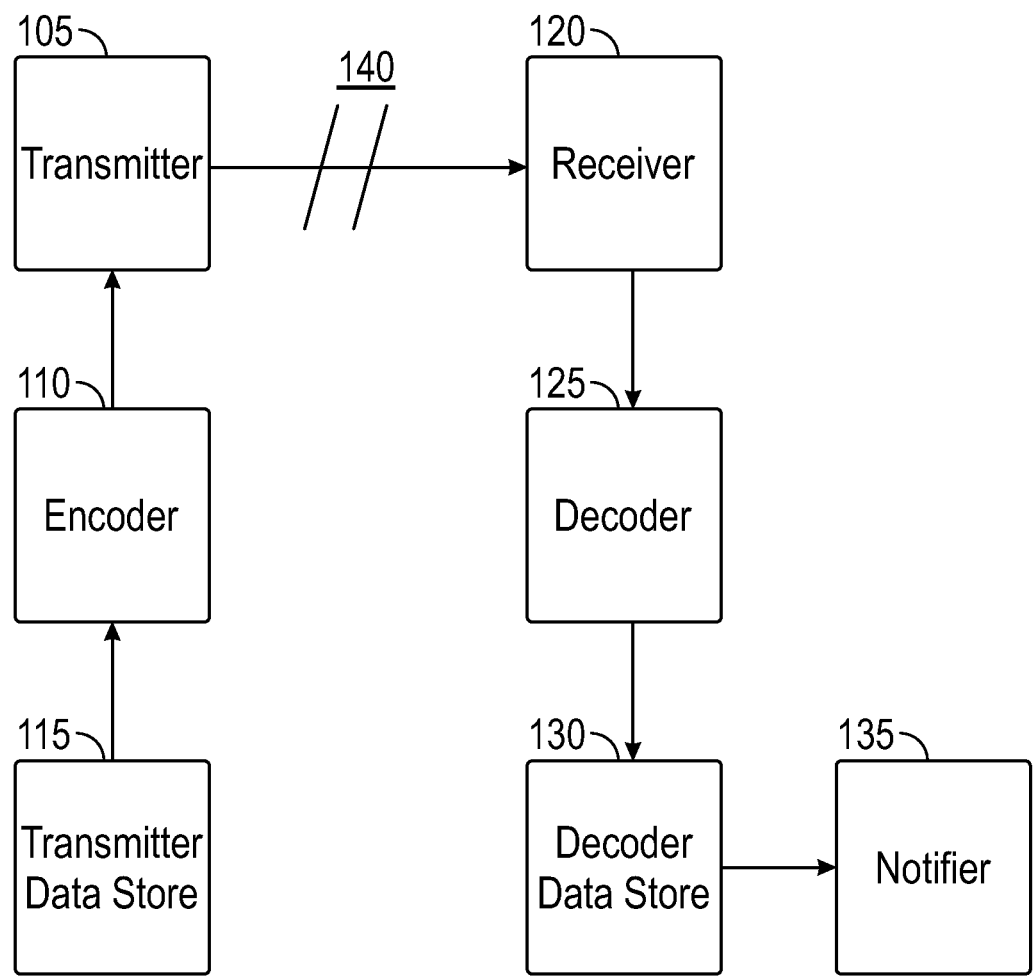
FIG. 1 illustrates an example system for transmitting and receiving data which has been encoded for tamper-resistance.

With reference to FIG. 1, an example system for transmitting a non-malleable message is disclosed. Original data, such as messages or other forms of information, can be stored in a transmitter data store (115). This message is then encoded using encoder (110), according to the non-malleable construction described herein. The encoded message is then transmitted by transmitter (105) over a channel (140) to a receiver (120). The message, while in transit from transmitter (105) to receiver (120), is subject to being modified, either intentionally by an adversary, or inadvertently due to, for example, noise in the channel (140). As non-limiting examples, an adversary may modify one or more bits of message information. Alternatively, or possibly in addition, the media over which the message travels may introduce one or more errors due to signal noise.

After being received at receiver (120), the message is decoded using decoder (125) according to the operations described herein, and stored in the decoder data store (130). As described herein, the decoder (125) can be configured in such a way that the output of the decoder (125) is limited to be one of an original message (e.g., as was stored in a transmitter data store (115)), a completely unrelated message, or no message at all (such as a failure state). The output of the decoder (125) is then input to notifier (135), which can be configured to provide the output of decoder (125) to an operator, such as an individual or a further system configured to operate on the output.

Figure 2:
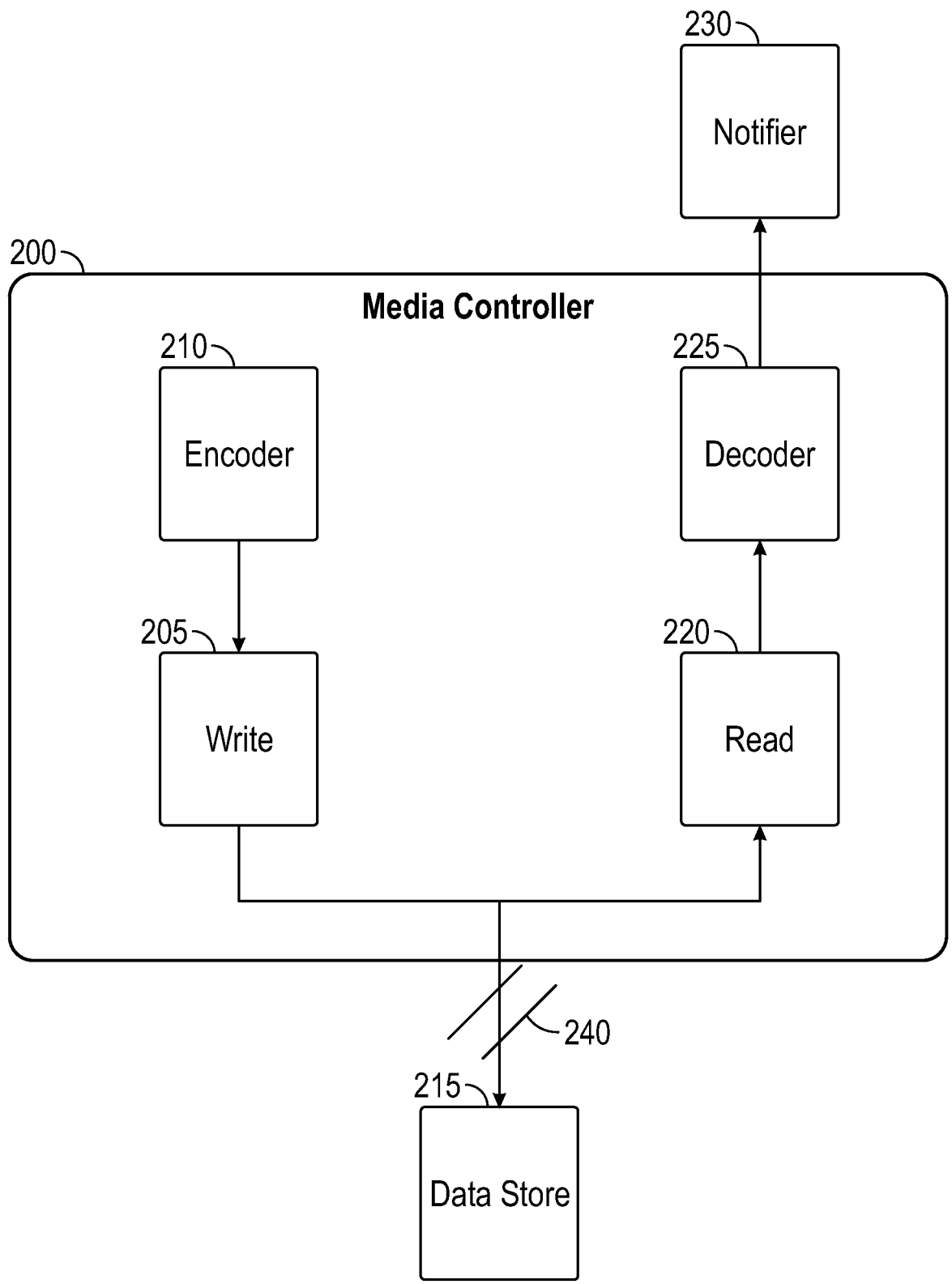
FIG. 2 illustrates an example system for storing data which has been encoded for tamper-resistance.

With reference to FIG. 2, an example system for a media controller (200) for reading and writing a non-malleable message is disclosed. Original data, such as messages or other forms of information, can be stored in data store (215). Data may be provided to the data store by media controller (200), which can be configured to include modules for encoding (e.g., encoder (210)), decoding (e.g., decoder (225)), writing (e.g., writer (205)), and reading (e.g., reader (220)).

This message received by media controller (200) for storage can be then encoded using encoder (210), according to the non-malleable construction operations described herein. The encoded message is provided to a write module (205) for storage in data store (215). The message, while in transit from write module (205) to the data store (215), is subject to being modified, either intentionally by an adversary, or inadvertently due to, for example, noise in the channel (e.g., channel 240). As non-limiting examples, an adversary may modify one or more bits of message information. Alternatively, or possibly in addition, the media over which the message travels may introduce one or more errors due to signal noise, or the media comprising data store (215) could become corrupted due to any number of common failures to which storage media are subject.

After being read from the data store (215) by the read module (220), the message is decoded using decoder (225) according to the non-malleable construction operations described herein. As described herein, the decoder (225) can be configured in such a way that the output of the decoder (225) is limited to be one of the original message (e.g., as stored in a transmitter data store (215)), a completely unrelated message, or no message at all (such as a failure state). The output of the decoder (225) is then input to notifier (230) which can be configured to provide the output of the decoder (225) to an operator, such as an individual or a further system configured to operate on the output.

With respect to generating the non-malleable code based on the original message, the three main components in our construction are a time-lock puzzle, a non-malleable commitment, and a one-message SPS zero-knowledge proof of consistency.

The inventive construction NMCode=(NMCode.E, NMCode.D) for a message space $\{0,1\}^\lambda$ and depth bound $T$ is informally described as:

NMCode.E(m):
1. Let $Z$ be a time-lock puzzle with hardness $T$ and underlying message m.
2. Let c be a non-malleable commitment to m.
3. Let $\pi$ be a zero-knowledge proof of consistency between $Z$ and c.
4. Output $\dot{Z}:=(Z,c,\pi)$.

NMCode. D(Z,c,$\pi$):
1. Verify the proof $\pi$.
2. If verified, solve the puzzle $Z$, and output the underlying message. Otherwise, output 0.

A time-lock puzzle can be solved by "brute-force" in-depth $T$, but cannot be solved in-depth $\ll T$. However, time-lock puzzles may be malleable (in fact, the construction based on repeated squaring is easily malleable). Non-malleable commitments are, by definition, non-malleable but as opposed to time-lock puzzles, cannot be "brute-force" opened in polynomial time. Intuitively, adding the zero-knowledge proof of consistency in the above construction ties the hands of the attacker and achieves the desired properties of each of the primitives. The scheme inherits non-malleability from the non-malleable commitment while preserving the ability to solve the time-lock puzzle in polynomial time, which allows extraction of the underlying message and thereby decoding in polynomial time.

For efficiency, time-lock puzzles have a built-in trapdoor that allows one to generate puzzles very fast (while solving them requires many sequential resources). Thus, the running time of NMCode.E(m) step 3 (generation of the zero-knowledge proof) takes fixed polynomial time (in the security parameter), independent of the depth bound $T$. This is why NMCode.E has a fixed running time, polynomial in the security parameter, independent of $T$. Negligible soundness of our construction, at a high level, is inherited from the security of the underlying primitives. Lastly, we use non-interactive non-malleable commitments, which are based on time-lock puzzles (and keyless collision-resistant hash functions or keyless multi-collision resistant hash functions, respectively).

The Non-Malleable Code

In this section, we present a construction of a non-malleable code that satisfies non-malleability against all non-uniform polynomial-size attackers that have bounded polynomial depth. In other words, the only way to maul a codeword is by having high depth.

Our construction relies on several building blocks on which we elaborate next.

1. A time-lock puzzle TL=(TL.Gen, TL.Sol) which, for all large enough difficulty parameters t, allows to generate puzzles which are hard for any (non-uniform) machine whose parallel time/depth is at most $t^\epsilon$, even it has size $2^{3\lambda}$. More precisely, for a difficulty parameter t, it is $(S^{TL}, \epsilon)$ hard for a fixed $\epsilon \in (0,1)$ and for $S^{TL}(\lambda)=2^{3\lambda}$.

2. A one-message SPS zero-knowledge argument system ZK=(ZK.P, ZK.V) which is weakly sound with respect to all non-uniform polynomial-size attackers, there is a (uniform) simulator that requires sub-exponential size and fixed polynomial time, and zero-knowledge holds with respect to sub-exponential size adversaries. More precisely, it is $(S_P^{ZK}, K^{ZK})$-sound and $(S_D^{ZK}, S_{Sim}^{ZK}, T_{Sim}^{ZK})$-zero-knowledge for all polynomial functions $S_P^{ZK}$ and where $K^{ZK} \in \text{poly}(\lambda)$ is a fixed polynomial, $S_D^{ZK}(\lambda)=2^{\lambda^\eta}$, $S_{Sim}^{ZK}(\lambda)=2^{\lambda^\eta}$, and $T_{Sim}^{ZK}(\lambda)=\lambda^2$.

3. A one-message non-malleable tag-based commitment scheme NMCom=(NMCom.C, NMCom.O) which is hiding for all (non-uniform) polynomial-size distinguishers, extractable either in size and time $2^{log^2\lambda}$ or in $2^\lambda$ size and $\lambda^3$ time, and non-malleable for all exponential size and polynomial time tampering functions.

More precisely, it is $(S^{NMCom}, T^{NMCom})$-hiding, $(S_{Ext_1}^{NMCom}, T_{Ext_1}^{NMCom})$-extractable via NMCom.Ext$_1$ and $(S_{Ext_2}^{NMCom}, T_{Ext_2}^{NMCom})$-extractable via NMCom.Ext$_2$, and $(S_{NM}^{NMCom}, T_{NM}^{NMCom})$-non-malleable for all polynomial functions $T^{NMCom}$ and $T_{NM}^{NMCom}$, and where $S^{NMCom}(\lambda) = 2^{\lambda^{\eta''}}$ where $\eta'' > \eta'$, $S_{Ext_1}^{NMCom}(\lambda) = T_{Ext_1}^{NMCom}(\lambda) = 2^{log^2\lambda}$, $S_{Ext_2}^{NMCom}(\lambda) = 2^{2\lambda}$, $T_{Ext_2}^{NMCom}(\lambda) = \lambda^3$), and $S_{NM}^{NMCom} = 2^\lambda$.

4. Sig=(Sig.G, Sig.S, Sig.V). A one-time signature scheme, unforgeable for polynomial-size attackers.

We show that assuming the existence of the above primitives, there is a code that is non-malleable for all polynomial-size attackers that run in bounded polynomial depth. We denote the latter T. Our main result is summarized as follows:

Assume a time-lock puzzle TL, a one-message SPS zero-knowledge system ZK, a one-message non-malleable commitment scheme NMCom, and a one-time signature scheme Sig, as above. Then, there exists constants $\alpha$, $\beta$, $\gamma \in \mathbb{N}$ such that for any large enough polynomial T, there is a code NMCode=(NMCode.E, NMCode.D) (described in FIGS. 3, 4, and 5) with the following properties:
1. The input of NMCode. E is a message from $\{0,1\}^\lambda$ and it outputs a codeword in $\{0,1\}^{\lambda^\alpha}$.
2. The running time of NMCode.E is $\lambda^\beta$ and the running time of NMCode.D is $(T \cdot \lambda)^\gamma$.
3. It is (S, T)-non-malleable for all polynomials S($\lambda$).

Fix T, the upper bound on the depth of the tampering function. The high-level idea of the construction is to combine the hardness for parallel machines that comes from a time-lock puzzle together with non-malleability that comes from a non-malleable commitment. Specifically, the way we combine them is so that an encoding of a message m consists of a time-lock puzzle for m, a non-malleable commitment for m, and a zero-knowledge proof that ties them together and asserts that they have the same underlying message. The construction is described formally in FIGS. 3, 4, and 5. FIG. 3 illustrates the encoding procedure NMCode. E. FIG. 4 illustrates the decoding procedure NMCode. D. FIG. 5 illustrates the Relation $\mathcal{R}_u$ referenced in FIG. 3.

Examples show that the resulting non-malleable code cannot be mauled in depth better than T even if the total size of the solver is exponential in $\lambda$. For that, we need to make all of our underlying building blocks sub-exponentially secure (in particular, they have to remain secure in the presence of an exponential size adversary). We focus on the polynomial regime for simplicity.

The Case of Uniform Tampering

In this section, we focus on the natural class of tampering functions that consist of a uniform polynomial-size algorithm with bounded polynomial parallel running time.

The construction is essentially the same as the one for non-uniform tampering functions and the main differences are in how we instantiate the building blocks and how the security proof goes through. We note that the time-lock puzzle and the signature scheme that we use (Items 1 and 4 below) are the same as described above.

1. A time-lock puzzle TL=(TL.Gen, TL.Sol) which, for all large enough difficulty parameters t, allows to generate puzzles which are hard for any (non-uniform) machine whose parallel time is at most $t^\epsilon$, even it has size $2^{3\lambda}$. More precisely, for a difficulty parameter t, it is $(S^{TL}, \epsilon)$-hard for a fixed $\epsilon \in (0,1)$ and for $S^{TL}(2)=2^{3\lambda}$.

2. A one-message zero-knowledge argument system ZK= (ZK.P, ZK.V), which is sound with respect to all uniform polynomial-size attackers, there is a (uniform) simulator that requires sub-exponential size and fixed polynomial time, and zero-knowledge holds with respect to sub-exponential size adversaries.

More precisely, it is $(S_P^{ZK}, \kappa^{ZK})$-sound and $(S_D^{ZK}, S_{Sim}^{ZK}, T_{Sim}^{ZK})$-zero-knowledge for all polynomial functions $S_P^{ZK}$ and where $\kappa^{ZK}=0$, $S_D^{ZK}(\lambda)=2^{\lambda^\eta}$, $S_{Sim}^{ZK}(\lambda)=2^{\lambda^{\eta'}}$, and $T_{Sim}^{ZK}(\lambda)=\lambda^2$.

3. A one-message non-malleable tag-based commitment scheme NMCom=(NMCom.C, NMCom.O) which is hiding for all (non-uniform) polynomial-size distinguishers, extractable either in size and time $2^{log^2\lambda}$ or in $2^\lambda$ size and $\lambda^3$ time, and non-malleable for all uniform exponential size and polynomial time tampering functions.

More precisely, it is $S^{NMCom}$-hiding, $(S_{Ext_1}^{NMCom}, T_{Ext_1}^{NMCom})$-extractable via NMCom.Ext$_1$ and $(S_{Ext_2}^{NMCom}, T_{Ext_2}^{NMCom})$-extractable via NMCom.Ext$_2$, and $(S_{NM}^{NMCom}, T_{NM}^{NMCom}, \kappa_{NM}^{NMCom})$-non-malleable for all polynomial functions $S^{NMCom}$ and $T_{NM}^{NMCom}$, and where $S_{Ext_1}^{NMCom}(\lambda) = T_{Ext_1}^{NMCom}(\lambda) = 2^{log^2\lambda}$, $S_{Ext_2}^{NMCom}(\lambda) = 2^{2\lambda}$, $T_{Ext_2}^{NMCom}(\lambda) = \lambda^3$), $S_{NM}^{NMCom} = 2^\lambda$, and $\kappa_{NM}^{NMCom} = 0$.

4. Sig=(Sig.G, Sig.S, Sig.V). A one-time signature scheme, unforgeable for polynomial-size attackers.

Hardware Overview

Figure 6:
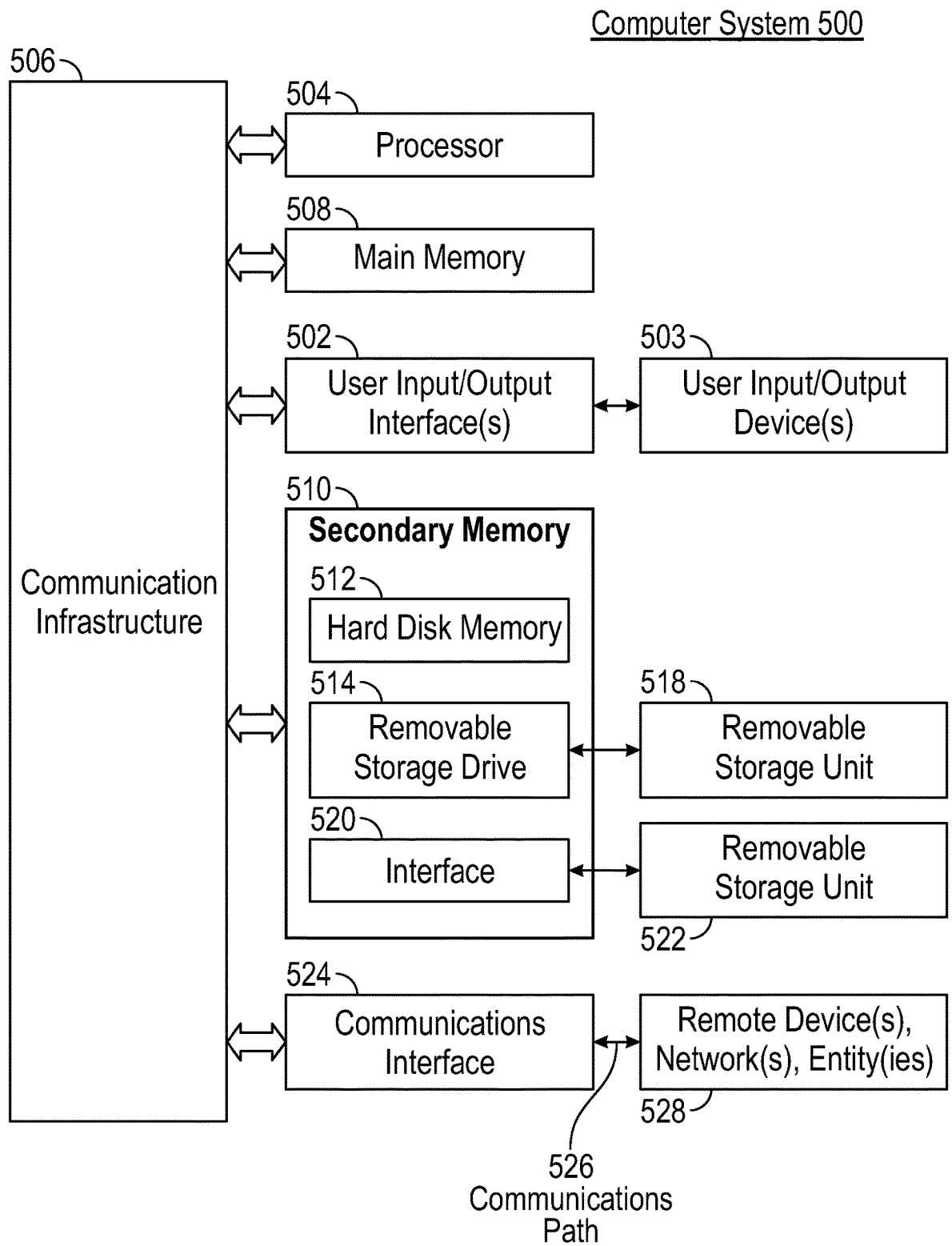
FIG. 6 illustrates an example computer system for implementing systems and methods for encoding and decoding data for tamper-resistance.
Figure 7:
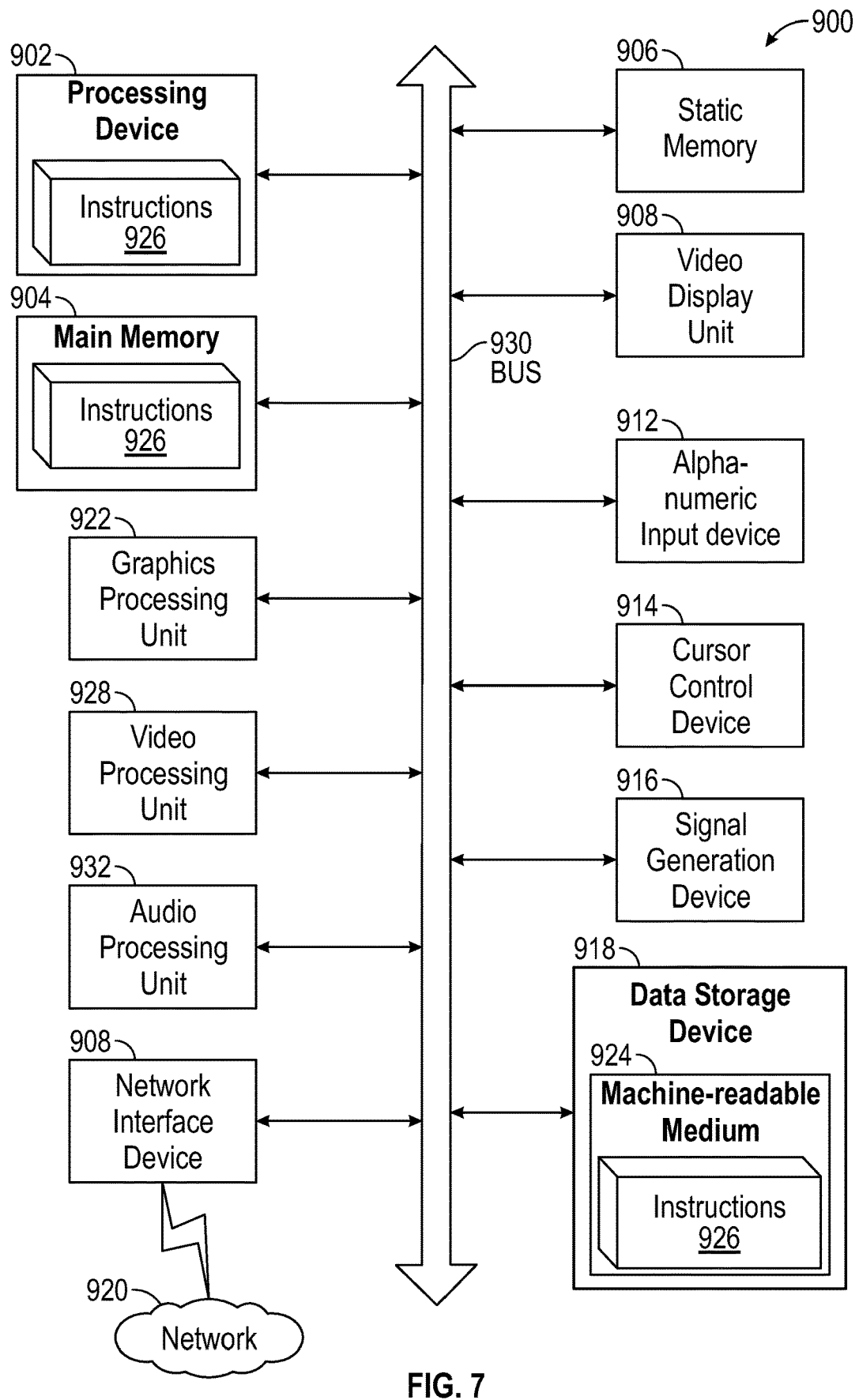
FIG. 7 illustrates further aspects of an example computer system for implementing systems and methods for encoding and decoding data for tamper-resistance.

FIGS. 6 and 7 depict example computer systems useful for implementing various embodiments described in the present disclosure. Various embodiments may be implemented, for example, using one or more computer systems, such as computer system 500 shown in FIG. 6. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity (ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 7 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but is not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A messaging system secure against attacks of unbounded polynomial size, the system comprising:
    a transmitter data store for storing an original message;
    an encoder module configured for creating a non-malleable copy of the original message by:
        generating a time-lock puzzle Z, the time-lock puzzle Z having hardness T, and being based on the original message;
        generating a non-malleable commitment c, based on the original message;
        generating a proof pi as a zero-knowledge proof of consistency between Z and c;
        storing Z, c, and pi in the transmitter data store as the non-malleable copy of the original message;
    a transmitter module configured for transmitting the non-malleable copy of the original message to a receiver; and
    a decoder module at the receiver, the decoder module configured for decoding the non-malleable copy of the original message by:
        verifying the proof pi;
        when the proof pi is verified:
            solving the time-lock puzzle Z and generating the original message as an output; and
            storing the original message in a receiver data store.

2. The system of claim 1, further comprising:
    when the proof pi is not verified, generating a notification that the original message has been modified; and
    generating a message, unrelated to the original message, as the output of the decoder module.

3. The system of claim 1, wherein the encoder module does not require a trusted setup.

4. The system of claim 1, further comprising decoding the message such that a resultant decoded message is either: (a) the original message, or (b) an unrelated message that was generated without knowing the original message.

5. The system of claim 1, wherein the original message cannot be modified without first successfully decoding the original message.

6. The system of claim 1, wherein the non-malleable copy of the original message is non-malleable for all polynomial-size attackers that execute in bounded polynomial depth on one or more processing devices.

7. A media storage system secure against attacks of unbounded polynomial size, the system comprising:
    a media controller coupled to a data store for storing an original message, the media controller further comprising:
        an encoder module configured for creating a non-malleable copy of the original message by:
            generating a time-lock puzzle Z, the time-lock puzzle Z having hardness T, and being based on the original message;
            generating a non-malleable commitment c, based on the original message;
            generating a proof pi as a zero-knowledge proof of consistency between Z and c;
        a data store module configured for storing Z, c, and pi as the non-malleable copy of the original message;
        a read module configured for reading the non-malleable copy of the original message from the data store module; and
        a decoder module configured for decoding the non-malleable copy of the original message by:
            verifying the proof pi;
            when the proof pi is verified:
                solving the time-lock puzzle Z and generating the original message as an output; and
                storing the original message in a data store.

8. The system of claim 7, wherein the encoder module does not require a trusted setup.

9. The system of claim 7, further comprising decoding the message such that a resultant decoded message is either: (a) the original message, or (b) an unrelated message.

10. The system of claim 7, wherein the original message cannot be modified without first successfully decoding the original message.

11. The system of claim 7, wherein the non-malleable copy of the original message is non-malleable for all polynomial-size attackers that execute in bounded polynomial depth on one or more processing devices.

12. A method for securing a messaging system against polynomial size tampering functions having bounded polynomial depth, the method comprising:
    storing an original message in a transmitter data store;
    creating a non-malleable copy of the original message by:
        generating a time-lock puzzle Z, the time-lock puzzle Z having hardness T, and being based on the original message;
        generating a non-malleable commitment c, based on the original message;
        generating a proof pi as a zero-knowledge proof of consistency between Z and c;
    storing Z, c, and pi in the data store as the non-malleable copy of the original message;
    transmitting the non-malleable copy of the original message from the transmitter data store to a receiver; and
    decoding the non-malleable copy of the original message by:
        verifying the proof pi;
        when proof pi is verified, solving the time-lock puzzle Z and generating the original message as an output; and
    storing the original message in a receiver data store.

13. The method of claim 12, wherein creating of the non-malleable copy of the original message does not require a trusted setup.

14. The method of claim 12, further comprising decoding the message such that a resultant decoded message is either: (a) the original message, or (b) an unrelated message generated without knowing the original message.

15. The method of claim 12, wherein the original message cannot be modified without first successfully decoding it.

16. The method of claim 12, wherein the non-malleable copy of the original message is non-malleable for all polynomial-size attackers that run in bounded polynomial depth.

* * * * *